(12) United States Patent
Ziegler et al.

(10) Patent No.: US 10,981,362 B2
(45) Date of Patent: Apr. 20, 2021

(54) METHOD TO PRODUCE A VENEERED ELEMENT

(71) Applicant: Välinge Innovation AB, Viken (SE)

(72) Inventors: Goran Ziegler, Viken (SE); Rickard Rittinge, Viken (SE)

(73) Assignee: VALINGE INNOVATION AB, Viken (SE)

( * ) Notice: Subject to any disclaimer, the term of this patent is extended or adjusted under 35 U.S.C. 154(b) by 46 days.

(21) Appl. No.: 16/223,833

(22) Filed: Dec. 18, 2018

(65) Prior Publication Data

US 2019/0210330 A1  Jul. 11, 2019

(30) Foreign Application Priority Data

Jan. 11, 2018 (SE) .................................. 1850031-4

(51) Int. Cl.
*B32B 21/14* (2006.01)
*B32B 3/26* (2006.01)
(Continued)

(52) U.S. Cl.
CPC ................ *B32B 21/14* (2013.01); *B27N 3/04* (2013.01); *B27N 3/24* (2013.01); *B27N 7/005* (2013.01);
(Continued)

(58) Field of Classification Search
CPC ......... B32B 21/00; B32B 21/02; B32B 21/04; B32B 21/042; B32B 21/08; B32B 21/14;
(Continued)

(56) References Cited

U.S. PATENT DOCUMENTS 2,018,712 A  10/1935  Elmendorf
2,419,614 A   4/1947  Welch
(Continued)

FOREIGN PATENT DOCUMENTS

AU    80284/75      6/1975
AU    2011236087 A1  5/2013
(Continued)

OTHER PUBLICATIONS

U.S. Appl. No. 14/593,458, filed Jan. 9, 2015, Göran Ziegler (Cited herein as US Patent Application Publication No. 2015/0197943 A1 of Jul. 16, 2015).
(Continued)

*Primary Examiner* — Philip C Tucker
*Assistant Examiner* — Brian R Slawski
(74) *Attorney, Agent, or Firm* — Buchanan Ingersoll & Rooney P.C.

(57) ABSTRACT

A method to produce a veneered element, the method including applying a first layer on a substrate, applying a second layer on a veneer layer, applying the veneer layer with the second layer applied thereto on the first layer, such that the second layer is facing the first layer, pressing the first layer, the second layer and the veneer layer together to form a veneered element, thereby material originating from the second layer permeates into the veneer layer, and wherein, after pressing, the first layer is visible through a crack, cavity, hole and/or knot of the veneer layer. Also, a veneered element.

15 Claims, 2 Drawing Sheets

(51) Int. Cl.
    *B32B 21/02*     (2006.01)
    *B27N 3/24*     (2006.01)
    *E04F 15/04*     (2006.01)
    *B27N 3/04*     (2006.01)
    *E04F 15/10*     (2006.01)
    *B27N 7/00*     (2006.01)
    *B29C 65/48*     (2006.01)
    *B29C 65/00*     (2006.01)

(52) U.S. Cl.
    CPC ............... *B32B 3/26* (2013.01); *B32B 21/02* (2013.01); *E04F 15/046* (2013.01); *E04F 15/102* (2013.01); *B29C 65/486* (2013.01); *B29C 65/4835* (2013.01); *B29C 65/4865* (2013.01); *B29C 66/45* (2013.01); *B32B 2471/00* (2013.01)

(58) Field of Classification Search
    CPC . B32B 2471/00; B32B 2607/00; B32B 13/02; B32B 13/08; B32B 13/14; B32B 19/042; B32B 19/046; B32B 21/06; B32B 21/10; B32B 21/13; B32B 2250/02; B32B 2255/08; B32B 2255/24; B32B 2255/26; B32B 2260/026; B32B 2260/028; B32B 2260/046; B32B 2307/402; B32B 2419/06; B32B 2479/00; B32B 27/10; B32B 27/304; B32B 27/40; B32B 29/005; B32B 29/02; B32B 3/14; B32B 3/26; B32B 5/022; B32B 9/005; B32B 9/02; B32B 9/047; B32B 9/06; B44C 5/043; E04F 13/0871; E04F 15/046; E04F 15/102; B29C 65/00; B29C 65/48; B29C 65/4815; B29C 65/483; B29C 65/4835; B29C 65/486; B29C 65/4865; B29C 66/00; B29C 66/02242; B29C 66/41; B29C 66/45; B27N 3/04; B27N 3/24; B27N 7/005
    USPC ... 156/60, 61, 62.2, 63, 71, 90, 94, 98, 153, 156/250, 252, 256, 278, 279, 293, 307.1, 156/307.3, 307.5, 310; 428/131, 134, 428/135, 136, 137, 138, 139, 151, 534, 428/535, 536, 537.1; 427/180, 201, 202, 427/206; 52/403.1, 578, 588.1
    See application file for complete search history.

(56) References Cited

U.S. PATENT DOCUMENTS

| | | |
|---|---|---|
| 2,587,064 A | 2/1952 | Rapson |
| 2,630,395 A | 3/1953 | McCullough |
| 2,634,534 A | 4/1953 | Brown |
| 2,695,857 A | 11/1954 | Lewis et al. |
| 2,720,478 A | 10/1955 | Hogg |
| 2,831,793 A * | 4/1958 | Elmendorf ............... B27D 1/06 428/139 |
| 2,831,794 A | 4/1958 | Elmendorf |
| 2,932,596 A | 4/1960 | Rayner |
| 2,962,081 A | 11/1960 | Dobry et al. |
| 2,992,152 A | 7/1961 | Chapman |
| 3,032,820 A | 5/1962 | Johnson |
| 3,135,643 A | 6/1964 | Michl |
| 3,286,006 A | 11/1966 | Annand |
| 3,308,013 A | 3/1967 | Bryant |
| 3,325,302 A | 6/1967 | Hosfeld |
| 3,342,621 A | 9/1967 | Point et al. |
| 3,345,234 A | 10/1967 | Jecker et al. |
| 3,392,082 A | 7/1968 | Lloyd |
| 3,426,730 A | 2/1969 | Lawson et al. |
| 3,463,653 A | 8/1969 | Letter |
| 3,486,484 A | 12/1969 | Bullough |
| 3,533,725 A | 10/1970 | Bridgeford |
| 3,540,978 A | 11/1970 | Ames |
| 3,565,665 A | 2/1971 | Stranch et al. |
| 3,578,522 A | 5/1971 | Rauch |
| 3,615,279 A | 10/1971 | Ward, Jr. |
| 3,673,020 A | 6/1972 | De Jaeger |
| 3,729,368 A | 4/1973 | Ingham |
| 3,844,863 A | 10/1974 | Forsythe |
| 3,846,219 A | 11/1974 | Kunz |
| 3,880,687 A | 4/1975 | Elmendorf et al. |
| 3,895,984 A | 7/1975 | Cone et al. |
| 3,897,185 A | 7/1975 | Beyer |
| 3,897,588 A | 7/1975 | Nohtomi |
| 3,914,359 A | 10/1975 | Bevan |
| 3,950,599 A | 4/1976 | Board, Jr. |
| 3,956,542 A | 5/1976 | Roberti |
| 3,961,108 A | 6/1976 | Rosner et al. |
| 4,052,739 A | 10/1977 | Wada et al. |
| 4,093,766 A | 6/1978 | Scher et al. |
| 4,115,178 A | 9/1978 | Cone et al. |
| 4,126,725 A | 11/1978 | Shiflet |
| 4,131,705 A | 12/1978 | Kubinsky |
| 4,263,373 A | 4/1981 | McCaskey, Jr. et al. |
| 4,277,527 A | 7/1981 | Duhl |
| 4,311,621 A | 1/1982 | Nishizawa et al. |
| 4,313,857 A | 2/1982 | Blount |
| 4,337,290 A | 6/1982 | Kelly et al. |
| 4,361,612 A | 11/1982 | Shaner |
| 4,420,351 A | 12/1983 | Lussi |
| 4,420,525 A | 12/1983 | Parks |
| 4,430,375 A | 2/1984 | Scher et al. |
| 4,430,380 A | 2/1984 | Hönel |
| 4,474,920 A | 10/1984 | Kyminas et al. |
| 4,743,484 A | 5/1988 | Robbins |
| 4,863,777 A | 9/1989 | Callaway et al. |
| 4,872,825 A | 10/1989 | Ross |
| 4,890,656 A | 1/1990 | Ohsumi et al. |
| 4,911,969 A | 3/1990 | Ogata et al. |
| 4,942,084 A | 7/1990 | Prince |
| 5,034,272 A | 7/1991 | Lindgren et al. |
| 5,059,472 A | 10/1991 | LeBell et al. |
| 5,085,930 A | 2/1992 | Widmann et al. |
| 5,147,486 A | 9/1992 | Hoffman |
| 5,206,066 A | 4/1993 | Horacek |
| 5,246,765 A | 9/1993 | Lussi et al. |
| 5,258,216 A | 11/1993 | Von Bonin et al. |
| 5,292,576 A | 3/1994 | Sanders |
| 5,314,554 A | 5/1994 | Owens |
| 5,354,259 A | 10/1994 | Scholz et al. |
| 5,405,705 A | 4/1995 | Fujimoto |
| 5,422,170 A | 6/1995 | Iwata et al. |
| 5,447,752 A | 9/1995 | Cobb |
| 5,466,511 A | 11/1995 | O'Dell et al. |
| 5,543,193 A | 8/1996 | Tesch |
| 5,569,424 A | 10/1996 | Amour |
| 5,601,930 A | 2/1997 | Mehta et al. |
| 5,604,025 A | 2/1997 | Tesch |
| 5,609,966 A | 3/1997 | Perrin et al. |
| 5,755,068 A | 5/1998 | Ormiston |
| 5,766,522 A | 6/1998 | Daly et al. |
| 5,827,788 A | 10/1998 | Miyakoshi |
| 5,855,832 A | 1/1999 | Clausi |
| 5,891,564 A | 4/1999 | Schultz et al. |
| 5,925,211 A | 7/1999 | Rakauskas |
| 5,925,296 A | 7/1999 | Leese |
| 5,942,072 A | 8/1999 | McKinnon |
| 5,976,689 A | 11/1999 | Witt et al. |
| 5,985,397 A | 11/1999 | Witt et al. |
| 6,036,137 A | 3/2000 | Myren |
| 6,089,297 A * | 7/2000 | Shibagaki ............... B27D 1/10 144/346 |
| 6,103,377 A | 8/2000 | Clausi |
| 6,238,750 B1 | 5/2001 | Correll et al. |
| 6,291,625 B1 | 9/2001 | Hosgood |
| 6,468,645 B1 | 10/2002 | Clausi |
| 6,481,476 B1 | 11/2002 | Okamoto |
| 6,521,326 B1 | 2/2003 | Fischer et al. |
| 6,528,437 B1 | 3/2003 | Hepfinger et al. |

(56) References Cited

U.S. PATENT DOCUMENTS

| | | |
|---|---|---|
| 6,537,610 B1 | 3/2003 | Springer et al. |
| 6,620,349 B1 | 9/2003 | Lopez |
| 6,667,108 B2 | 12/2003 | Ellstrom |
| 6,769,217 B2 | 8/2004 | Nelson |
| 6,773,799 B1 | 8/2004 | Persson et al. |
| 6,803,110 B2 | 10/2004 | Drees et al. |
| 6,926,954 B2 | 8/2005 | Shuren et al. |
| 6,991,830 B1 | 1/2006 | Hansson et al. |
| 7,022,756 B2 | 4/2006 | Singer |
| 7,485,693 B2 | 2/2009 | Matsuda et al. |
| 7,568,322 B2 | 8/2009 | Pervan |
| 7,678,425 B2 | 3/2010 | Oldorff |
| 7,811,489 B2 | 10/2010 | Pervan |
| 7,918,062 B2 | 4/2011 | Chen |
| 8,021,741 B2 | 9/2011 | Chen |
| 8,206,534 B2 | 6/2012 | McDuff et al. |
| 8,245,477 B2 | 8/2012 | Pervan |
| 8,302,367 B2 | 11/2012 | Schulte |
| 8,349,234 B2 | 1/2013 | Ziegler et al. |
| 8,349,235 B2 | 1/2013 | Pervan et al. |
| 8,407,963 B2 | 4/2013 | Schulte |
| 8,419,877 B2 | 4/2013 | Pervan et al. |
| 8,431,054 B2 | 4/2013 | Pervan et al. |
| 8,480,841 B2 | 7/2013 | Pervan et al. |
| 8,481,111 B2 | 7/2013 | Ziegler et al. |
| 8,499,520 B2 | 8/2013 | Schulte |
| 8,617,439 B2 | 12/2013 | Pervan et al. |
| 8,635,829 B2 | 1/2014 | Schulte |
| 8,650,738 B2 | 2/2014 | Schulte |
| 8,663,785 B2 | 3/2014 | Ziegler et al. |
| 8,728,564 B2 | 5/2014 | Ziegler et al. |
| 8,752,352 B2 | 6/2014 | Schulte |
| 8,784,587 B2 | 7/2014 | Lindgren et al. |
| 8,920,874 B2 | 12/2014 | Ziegler et al. |
| 8,920,876 B2 | 12/2014 | Vetter et al. |
| 8,993,049 B2 | 3/2015 | Pervan |
| 9,085,905 B2 | 7/2015 | Persson et al. |
| 9,109,366 B2 | 8/2015 | Schulte |
| 9,181,698 B2 | 11/2015 | Pervan et al. |
| 9,255,405 B2 | 2/2016 | Pervan et al. |
| 9,296,191 B2 | 3/2016 | Pervan et al. |
| 9,352,499 B2 | 5/2016 | Ziegler et al. |
| 9,403,286 B2 | 8/2016 | Vetter et al. |
| 9,410,319 B2 | 8/2016 | Ziegler et al. |
| 9,556,622 B2 | 1/2017 | Pervan et al. |
| 9,783,996 B2 | 10/2017 | Pervan et al. |
| 10,017,950 B2 | 7/2018 | Pervan |
| 10,100,535 B2 | 10/2018 | Pervan et al. |
| 10,214,913 B2 | 2/2019 | Persson et al. |
| 10,286,633 B2 | 5/2019 | Lundblad et al. |
| 10,315,219 B2 | 6/2019 | Jacobsson |
| 10,344,379 B2 | 7/2019 | Pervan et al. |
| 10,364,578 B2 | 7/2019 | Pervan |
| 10,392,812 B2 | 8/2019 | Pervan |
| 10,442,152 B2 | 10/2019 | Schulte |
| 10,442,164 B2 | 10/2019 | Schulte |
| 10,493,729 B2 | 12/2019 | Pervan et al. |
| 10,513,094 B2 | 12/2019 | Persson et al. |
| 10,800,186 B2 | 10/2020 | Pervan et al. |
| 10,828,881 B2 | 11/2020 | Bergelin et al. |
| 10,857,765 B2 | 12/2020 | Schulte |
| 2001/0006704 A1 | 7/2001 | Chen et al. |
| 2001/0009309 A1 | 7/2001 | Taguchi et al. |
| 2002/0031620 A1 | 3/2002 | Yuzawa et al. |
| 2002/0054994 A1 | 5/2002 | Dupre et al. |
| 2002/0100231 A1 | 8/2002 | Miller |
| 2002/0155297 A1 | 10/2002 | Schuren |
| 2003/0008130 A1 | 1/2003 | Kaneko |
| 2003/0056873 A1 | 3/2003 | Nakos et al. |
| 2003/0059639 A1 | 3/2003 | Worsley |
| 2003/0102094 A1 | 6/2003 | Tirri et al. |
| 2003/0108760 A1 | 6/2003 | Haas et al. |
| 2003/0208980 A1 | 11/2003 | Miller et al. |
| 2004/0035078 A1 | 2/2004 | Pervan |
| 2004/0088946 A1 | 5/2004 | Liang et al. |
| 2004/0123542 A1 | 7/2004 | Grafenauer |
| 2004/0137255 A1 | 7/2004 | Martinez et al. |
| 2004/0191547 A1 | 9/2004 | Oldorff |
| 2004/0202857 A1 | 10/2004 | Singer |
| 2004/0206036 A1 | 10/2004 | Pervan |
| 2004/0237436 A1 | 12/2004 | Zuber et al. |
| 2004/0250911 A1 | 12/2004 | Vogel |
| 2004/0255541 A1 | 12/2004 | Thiers et al. |
| 2005/0003099 A1 | 1/2005 | Quist |
| 2005/0016107 A1 | 1/2005 | Rosenthal et al. |
| 2005/0079780 A1 | 4/2005 | Rowe et al. |
| 2005/0136234 A1 | 6/2005 | Hak et al. |
| 2005/0153150 A1 | 7/2005 | Wellwood et al. |
| 2005/0166514 A1 | 8/2005 | Pervan |
| 2005/0193677 A1 | 9/2005 | Vogel |
| 2005/0208255 A1 | 9/2005 | Pervan |
| 2005/0227040 A1 | 10/2005 | Toupalik |
| 2005/0252130 A1 | 11/2005 | Martensson |
| 2006/0008630 A1 | 1/2006 | Thiers et al. |
| 2006/0024465 A1 | 2/2006 | Briere |
| 2006/0032175 A1 | 2/2006 | Chen et al. |
| 2006/0048474 A1 | 3/2006 | Pervan et al. |
| 2006/0070321 A1 | 4/2006 | Au |
| 2006/0070325 A1 | 4/2006 | Magnusson |
| 2006/0145384 A1 | 7/2006 | Singer |
| 2006/0154015 A1 | 7/2006 | Miller et al. |
| 2006/0156672 A1 | 7/2006 | Laurent et al. |
| 2006/0172118 A1 | 8/2006 | Han et al. |
| 2006/0182938 A1 | 8/2006 | Oldorff |
| 2006/0183853 A1 | 8/2006 | Sczepan |
| 2007/0055012 A1 | 3/2007 | Caldwell |
| 2007/0066176 A1 | 3/2007 | Wenstrup et al. |
| 2007/0102108 A1 | 5/2007 | Zheng |
| 2007/0125275 A1 | 6/2007 | Bui |
| 2007/0148339 A1 | 6/2007 | Wescott |
| 2007/0166516 A1 | 7/2007 | Kim et al. |
| 2007/0184244 A1 | 8/2007 | Doehring |
| 2007/0207296 A1 | 9/2007 | Eisermann |
| 2007/0218260 A1 | 9/2007 | Miclo et al. |
| 2007/0224438 A1 | 9/2007 | Van Benthem et al. |
| 2007/0256804 A1 | 11/2007 | Garcis Espino et al. |
| 2008/0000179 A1 | 1/2008 | Pervan et al. |
| 2008/0000190 A1 | 1/2008 | Håkansson |
| 2008/0000417 A1 | 1/2008 | Pervan et al. |
| 2008/0032120 A1 | 2/2008 | Braun |
| 2008/0090032 A1 | 4/2008 | Perrin et al. |
| 2008/0093013 A1 | 4/2008 | Muller |
| 2008/0152876 A1 | 6/2008 | Magnusson |
| 2008/0176039 A1 | 7/2008 | Chen et al. |
| 2008/0263985 A1 | 10/2008 | Hasch et al. |
| 2009/0056257 A1 | 3/2009 | Mollinger et al. |
| 2009/0124704 A1 | 5/2009 | Jenkins |
| 2009/0135356 A1 | 5/2009 | Ando |
| 2009/0145066 A1 | 6/2009 | Pervan |
| 2009/0155612 A1 | 6/2009 | Pervan et al. |
| 2009/0165946 A1 | 7/2009 | Suzuki |
| 2009/0208646 A1 | 8/2009 | Kreuder et al. |
| 2009/0294037 A1 | 12/2009 | Oldorff |
| 2009/0311433 A1 | 12/2009 | Wittmann |
| 2010/0092731 A1 | 4/2010 | Pervan et al. |
| 2010/0136303 A1 | 6/2010 | Kreuder |
| 2010/0196678 A1 | 8/2010 | Vermeulen |
| 2010/0223881 A1 | 9/2010 | Kalwa |
| 2010/0239820 A1 | 9/2010 | Buhlmann |
| 2010/0291397 A1 | 11/2010 | Pervan et al. |
| 2010/0300030 A1 | 12/2010 | Pervan et al. |
| 2010/0304089 A1 | 12/2010 | Magnusson |
| 2010/0307675 A1 | 12/2010 | Buhlmann |
| 2010/0307677 A1 | 12/2010 | Buhlmann |
| 2010/0311854 A1 | 12/2010 | Thiers et al. |
| 2010/0314368 A1 | 12/2010 | Groeke |
| 2010/0319282 A1 | 12/2010 | Ruland |
| 2010/0323187 A1 | 12/2010 | Kalwa |
| 2010/0330376 A1 | 12/2010 | Trksak |
| 2011/0027501 A1 | 2/2011 | Guo |
| 2011/0175251 A1 | 7/2011 | Ziegler et al. |
| 2011/0177319 A1 | 7/2011 | Ziegler et al. |
| 2011/0177354 A1 | 7/2011 | Ziegler et al. |
| 2011/0189448 A1 | 8/2011 | Lindgren et al. |

(56) References Cited

U.S. PATENT DOCUMENTS

| | | |
|---|---|---|
| 2011/0247748 A1 | 10/2011 | Pervan et al. |
| 2011/0250404 A1 | 10/2011 | Pervan et al. |
| 2011/0262720 A1 | 10/2011 | Riebel et al. |
| 2011/0274872 A1 | 11/2011 | Yu |
| 2011/0283642 A1 | 11/2011 | Meirlaen et al. |
| 2011/0283650 A1 | 11/2011 | Pervan et al. |
| 2011/0287211 A1 | 11/2011 | Bailey et al. |
| 2011/0293823 A1 | 12/2011 | Bruderer et al. |
| 2011/0293906 A1 | 12/2011 | Jacobsson |
| 2012/0048487 A1 | 3/2012 | Brewster |
| 2012/0124932 A1 | 5/2012 | Schulte et al. |
| 2012/0263878 A1 | 10/2012 | Ziegler et al. |
| 2012/0263965 A1 | 10/2012 | Persson et al. |
| 2012/0264853 A1 | 10/2012 | Ziegler et al. |
| 2012/0276348 A1 | 11/2012 | Clausi et al. |
| 2012/0279161 A1 | 11/2012 | Håkansson et al. |
| 2012/0288689 A1 | 11/2012 | Hansson et al. |
| 2012/0308774 A1 | 12/2012 | Persson et al. |
| 2013/0025216 A1 | 1/2013 | Reichwein et al. |
| 2013/0092314 A1 | 4/2013 | Zeigler et al. |
| 2013/0095315 A1 | 4/2013 | Pervan et al. |
| 2013/0111845 A1 | 5/2013 | Pervan et al. |
| 2013/0189534 A1 | 7/2013 | Pervan et al. |
| 2013/0196119 A1 | 8/2013 | Dobecz |
| 2013/0269863 A1 | 10/2013 | Pervan et al. |
| 2013/0273244 A1 | 10/2013 | Vetter et al. |
| 2013/0273245 A1 | 10/2013 | Ziegler et al. |
| 2014/0027020 A1 | 1/2014 | Klaeusler et al. |
| 2014/0044872 A1 | 2/2014 | Pervan |
| 2014/0075874 A1 | 3/2014 | Pervan et al. |
| 2014/0147585 A1 | 5/2014 | Smith |
| 2014/0171554 A1 | 6/2014 | Ziegler et al. |
| 2014/0178630 A1 | 6/2014 | Pervan et al. |
| 2014/0186610 A1 | 7/2014 | Pervan |
| 2014/0199558 A1 | 7/2014 | Pervan et al. |
| 2014/0234531 A1 | 8/2014 | Ziegler et al. |
| 2014/0290171 A1 | 10/2014 | Vermeulen |
| 2014/0329064 A1 | 11/2014 | Döhring et al. |
| 2015/0017461 A1 | 1/2015 | Lindgren et al. |
| 2015/0072111 A1 | 3/2015 | Rischer et al. |
| 2015/0079280 A1 | 3/2015 | Vetter et al. |
| 2015/0093502 A1 | 4/2015 | Ziegler et al. |
| 2015/0111055 A1 | 4/2015 | Persson et al. |
| 2015/0118456 A1 | 4/2015 | Carlborg et al. |
| 2015/0159382 A1 | 6/2015 | Pervan |
| 2015/0197942 A1 | 7/2015 | Pervan et al. |
| 2015/0197943 A1 | 7/2015 | Ziegler et al. |
| 2015/0275526 A1 | 10/2015 | Persson et al. |
| 2015/0298433 A1 | 10/2015 | Kalwa |
| 2016/0031189 A1 | 2/2016 | Pervan et al. |
| 2016/0114495 A1 | 4/2016 | Pervan et al. |
| 2016/0186318 A1 | 6/2016 | Pervan et al. |
| 2016/0230400 A9 | 8/2016 | Pervan et al. |
| 2016/0297174 A1 | 10/2016 | Kim |
| 2016/0322041 A1 | 11/2016 | Kim |
| 2016/0326744 A1 | 11/2016 | Döhring et al. |
| 2016/0368180 A1 | 12/2016 | Ziegler et al. |
| 2016/0369507 A1 | 12/2016 | Pervan et al. |
| 2016/0375674 A1 | 12/2016 | Schulte |
| 2017/0120564 A1 | 5/2017 | Schulte |
| 2017/0165936 A1 | 6/2017 | Schulte |
| 2017/0190156 A1 | 7/2017 | Lundblad et al. |
| 2017/0305119 A1 | 10/2017 | Bergelin et al. |
| 2017/0348984 A1 | 12/2017 | Pervan et al. |
| 2018/0002934 A1 | 1/2018 | Pervan et al. |
| 2018/0291638 A1 | 10/2018 | Pervan |
| 2018/0370278 A1 | 12/2018 | Persson et al. |
| 2019/0010711 A1 | 1/2019 | Pervan et al. |
| 2019/0202178 A1 | 7/2019 | Ziegler |
| 2019/0210329 A1 | 7/2019 | Ziegler et al. |
| 2019/0277039 A1 | 9/2019 | Hakansson et al. |
| 2019/0284821 A1 | 9/2019 | Pervan |
| 2019/0292796 A1 | 9/2019 | Pervan et al. |
| 2019/0338534 A1 | 11/2019 | Pervan |
| 2020/0055287 A1 | 2/2020 | Lundblad et al. |
| 2020/0078825 A1 | 3/2020 | Jacobsson |
| 2020/0079059 A1 | 3/2020 | Schulte |
| 2020/0094512 A1 | 3/2020 | Schulte |
| 2020/0164622 A1 | 5/2020 | Pervan et al. |
| 2020/0215799 A1 | 7/2020 | Hedlund et al. |
| 2020/0223197 A1 | 7/2020 | Hedlund et al. |

FOREIGN PATENT DOCUMENTS

| | | |
|---|---|---|
| CH | 298894 A | 1/1954 |
| CN | 1709717 A | 12/2005 |
| CN | 102166775 A | 8/2011 |
| CN | 202200608 U | 4/2012 |
| CN | 104084994 A | 10/2014 |
| DE | 1 815 312 A1 | 7/1969 |
| DE | 7148789 U | 4/1972 |
| DE | 29 39 828 A1 | 4/1981 |
| DE | 33 34 921 A1 | 4/1985 |
| DE | 36 34 885 A1 | 4/1988 |
| DE | 42 33 050 A1 | 4/1993 |
| DE | 42 36 266 A1 | 5/1993 |
| DE | 202 14 532 U1 | 2/2004 |
| DE | 102 45 914 A1 | 4/2004 |
| DE | 103 00 247 A1 | 7/2004 |
| DE | 103 31 657 A1 | 2/2005 |
| DE | 20 2006 007 797 U1 | 8/2006 |
| DE | 10 2005 046 264 A1 | 4/2007 |
| DE | 10 2006 024 593 A | 12/2007 |
| DE | 10 2006 058 244 A1 | 6/2008 |
| DE | 10 2007 043 202 A1 | 3/2009 |
| DE | 20 2009 008 367 U1 | 9/2009 |
| DE | 10 2010 045 266 A | 3/2012 |
| DE | 20 2013 011 776 U1 | 7/2014 |
| DE | 20 2014 102 031 U1 | 7/2014 |
| DE | 20 2013 012 020 U1 | 2/2015 |
| DE | 10 2013 113 125 A1 | 5/2015 |
| EP | 0 129 430 A2 | 12/1984 |
| EP | 0 234 220 A2 | 9/1987 |
| EP | 0 129 430 B1 | 1/1990 |
| EP | 0 355 829 A2 | 2/1990 |
| EP | 0 592 013 A2 | 4/1994 |
| EP | 0 611 408 A1 | 8/1994 |
| EP | 0 656 443 A1 | 6/1995 |
| EP | 0 611 408 B1 | 9/1996 |
| EP | 0 732 449 A1 | 9/1996 |
| EP | 0 744 477 A2 | 11/1996 |
| EP | 0 914 914 A2 | 5/1999 |
| EP | 0 732 449 B1 | 8/1999 |
| EP | 0 744 477 B1 | 1/2000 |
| EP | 0 993 934 A2 | 4/2000 |
| EP | 1 035 255 A1 | 9/2000 |
| EP | 1 125 971 A1 | 8/2001 |
| EP | 1 136 251 A2 | 9/2001 |
| EP | 1 209 199 A1 | 5/2002 |
| EP | 1 249 322 A1 | 10/2002 |
| EP | 1 262 607 A1 | 12/2002 |
| EP | 1 454 763 A2 | 9/2004 |
| EP | 1 242 702 B1 | 11/2004 |
| EP | 1 498 241 A2 | 1/2005 |
| EP | 1 584 378 A1 | 10/2005 |
| EP | 1 657 055 A1 | 5/2006 |
| EP | 1 681 103 A2 | 7/2006 |
| EP | 1 690 603 A1 | 8/2006 |
| EP | 1 847 385 A1 | 10/2007 |
| EP | 1 961 556 A1 | 8/2008 |
| EP | 1 997 623 A1 | 12/2008 |
| EP | 2 025 484 A1 | 2/2009 |
| EP | 1 454 763 B1 | 8/2009 |
| EP | 2 105 320 A1 | 9/2009 |
| EP | 2 119 550 A1 | 11/2009 |
| EP | 2 246 500 A2 | 11/2010 |
| EP | 2 263 867 A1 | 12/2010 |
| EP | 2 264 259 A2 | 12/2010 |
| EP | 2 272 667 A1 | 1/2011 |
| EP | 2 272 668 A1 | 1/2011 |
| EP | 2 305 462 A1 | 4/2011 |
| EP | 2 353 861 A1 | 8/2011 |
| EP | 1 847 385 B1 | 9/2011 |
| EP | 2 263 867 B1 | 3/2012 |

(56) References Cited

FOREIGN PATENT DOCUMENTS

| | | |
|---|---|---|
| EP | 2 902 196 A1 | 8/2015 |
| EP | 2 902 196 B1 | 8/2016 |
| FR | 801 433 A | 8/1936 |
| FR | 2 873 953 A1 | 2/2006 |
| GB | 785008 | 10/1957 |
| GB | 984 170 A | 2/1965 |
| GB | 1090450 | 11/1967 |
| GB | 1 561 820 A | 3/1980 |
| GB | 2 238 983 A | 6/1991 |
| GB | 2 248 246 A | 4/1992 |
| GB | 2 464 541 A | 4/2010 |
| JP | S51-128409 A | 11/1976 |
| JP | S52-087212 A | 7/1977 |
| JP | S53-148506 | 12/1978 |
| JP | S56-049259 A | 5/1981 |
| JP | S56-151564 A | 11/1981 |
| JP | S58-084761 A | 5/1983 |
| JP | S59-101312 A | 6/1984 |
| JP | S64-062108 A | 3/1989 |
| JP | H02-188206 A | 7/1990 |
| JP | H02-198801 A | 8/1990 |
| JP | H02-229002 A | 9/1990 |
| JP | H03-030905 A | 2/1991 |
| JP | H03-211047 A | 9/1991 |
| JP | H03-267174 A | 11/1991 |
| JP | H04-107101 A | 4/1992 |
| JP | H04-247901 A | 9/1992 |
| JP | H04-269506 A | 9/1992 |
| JP | H05-077362 A | 3/1993 |
| JP | H05-237809 A | 9/1993 |
| JP | H06-312406 A | 11/1994 |
| JP | 07060704 A * | 3/1995 |
| JP | H08-207012 A | 8/1996 |
| JP | H09-164651 A | 6/1997 |
| JP | H10-002098 A | 1/1998 |
| JP | H10-18562 A | 1/1998 |
| JP | H10-086107 A | 4/1998 |
| JP | 2925749 B2 | 7/1999 |
| JP | H11-291203 A | 10/1999 |
| JP | 2000-226931 A | 8/2000 |
| JP | 2000-263520 A | 9/2000 |
| JP | 2001-287208 A | 10/2001 |
| JP | 2001-329681 A | 11/2001 |
| JP | 2003-311717 A | 11/2003 |
| JP | 2003-311718 A | 11/2003 |
| JP | 2004-068512 A | 3/2004 |
| JP | 2004-076476 A | 3/2004 |
| JP | 2005-034815 A | 2/2005 |
| JP | 2005-074682 A | 3/2005 |
| JP | 2005-170016 A | 6/2005 |
| JP | 2005-219215 A | 8/2005 |
| JP | 3705482 B2 | 10/2005 |
| JP | 2005-307582 A | 11/2005 |
| JP | 2007-098755 A | 4/2007 |
| JP | 2007-216692 A | 8/2007 |
| JP | 2007-268843 A | 10/2007 |
| JP | 2008-188826 A | 8/2008 |
| JP | 2010-017963 A | 1/2010 |
| JP | 2011-110768 A | 6/2011 |
| KR | 10-0997149 B1 | 11/2010 |
| KR | 10-1439066 B1 | 9/2014 |
| NZ | 225556 A1 | 2/1992 |
| SE | 469 326 B | 6/1993 |
| WO | WO 92/06832 A1 | 4/1992 |
| WO | WO 94/00280 A1 | 1/1994 |
| WO | WO 95/06568 A1 | 3/1995 |
| WO | WO 00/22225 A1 | 4/2000 |
| WO | WO 00/44576 A1 | 8/2000 |
| WO | WO 01/00409 A1 | 1/2001 |
| WO | WO 01/64408 A1 | 9/2001 |
| WO | WO 01/68367 A1 | 9/2001 |
| WO | WO 01/92037 A2 | 12/2001 |
| WO | WO 02/42167 A2 | 5/2002 |
| WO | WO 02/42373 A1 | 5/2002 |
| WO | WO 2004/050359 A1 | 6/2004 |
| WO | WO 2004/067874 A2 | 8/2004 |
| WO | WO 2005/035209 A2 | 4/2005 |
| WO | WO 2005/035209 A3 | 4/2005 |
| WO | WO 2005/035209 B1 | 4/2005 |
| WO | WO 2005/054599 A1 | 6/2005 |
| WO | WO 2005/054600 A1 | 6/2005 |
| WO | WO 2005/066431 A2 | 7/2005 |
| WO | WO 2005/097874 A2 | 10/2005 |
| WO | WO 2005/116337 A1 | 12/2005 |
| WO | WO 2005/116361 A1 | 12/2005 |
| WO | WO 2006/007413 A1 | 1/2006 |
| WO | WO 2006/013469 A1 | 2/2006 |
| WO | WO 2006/042651 A1 | 4/2006 |
| WO | WO 2006/043893 A1 | 4/2006 |
| WO | WO 2006/126930 A1 | 11/2006 |
| WO | WO 2007/042258 A1 | 4/2007 |
| WO | WO 2007/059294 A2 | 5/2007 |
| WO | WO 2008/004960 A2 | 1/2008 |
| WO | WO 2008/004960 A3 | 1/2008 |
| WO | WO 2008/148771 A1 | 12/2008 |
| WO | WO 2009/065768 A1 | 5/2009 |
| WO | WO 2009/065769 A2 | 5/2009 |
| WO | WO 2009/065769 A3 | 5/2009 |
| WO | WO 2009/080772 A1 | 7/2009 |
| WO | WO 2009/080813 A1 | 7/2009 |
| WO | WO 2009/116926 A1 | 9/2009 |
| WO | WO 2009/124704 A1 | 10/2009 |
| WO | WO 2010/046698 A1 | 4/2010 |
| WO | WO 2010/087752 A1 | 8/2010 |
| WO | WO 2011/058233 A1 | 5/2011 |
| WO | WO 2011/129755 A2 | 10/2011 |
| WO | WO 2011/129757 A1 | 10/2011 |
| WO | WO 2011/141851 A2 | 11/2011 |
| WO | WO 2012/004699 A2 | 1/2012 |
| WO | WO 2013/079950 A1 | 6/2013 |
| WO | WO 2013/167576 A2 | 11/2013 |
| WO | WO 2013/182191 A2 | 12/2013 |
| WO | WO 2013/182191 A3 | 12/2013 |
| WO | WO 2014/017972 A1 | 1/2014 |
| WO | WO 2014/109699 A1 | 7/2014 |
| WO | WO 2015/078434 A1 | 6/2015 |
| WO | WO 2015/105455 A1 | 7/2015 |
| WO | WO 2015/105456 A1 | 7/2015 |
| WO | WO 2015/174909 A1 | 11/2015 |
| WO | WO-2015174909 A1 * | 11/2015 ............ B32B 21/08 |
| WO | WO 2016/151435 A1 | 9/2016 |

OTHER PUBLICATIONS

U.S. Appl. No. 15/183,424, filed Jun. 15, 2016, Darko Pervan (Cited herein as US Patent Application Publication No. 2016/0369507 A1 of Dec. 22, 2016).

U.S. Appl. No. 15/496,357, filed Apr. 25, 2017, Marcus Bergelin (Cited herein as U.S. Patent Application Publication No. 2017/0305119 A1 of Oct. 26, 2017).

U.S. Appl. No. 15/039,748, filed May 26, 2016, Guido Schulte (Cited herein as U.S. Patent Application Publication No. 2016/0375674 A1 of Dec. 29, 2016).

U.S. Appl. No. 16/132,977, filed Sep. 17, 2018, Darko Pervan (Cited herein as U.S. Patent Application Publication No. 2019/0010711 A1 of Jan. 10, 2019).

U.S. Appl. No. 16/223,708, filed Dec. 18, 2018, Göran Ziegler (Cited herein as U.S. Patent Application Publication No. 2019/0210329 A1 of Jul. 11, 2019).

U.S. Appl. No. 16/325,543, filed Feb. 14, 2019, Göran Ziegler (Cited herein as U.S. Patent Application Publication No. 2019/0202178 A1 of Jul. 4, 2019).

U.S. Appl. No. 16/365,764, filed Mar. 27, 2019, Christer Lundblad (Cited herein as U.S. Patent Application Publication No. 2020/0055287 A1 of Feb. 20, 2020).

U.S. Appl. No. 16/556,289, filed Aug. 30, 2019, Guido Schulte (Cited herein as U.S. Patent Application Publication No. 2020/0094512 A1 of Mar. 26, 2020).

U.S. Appl. No. 16/571,547, filed Sep. 16, 2019, Guido Schulte (Cited herein as U.S. Patent Application Publication No. 2020/0079059 A1 of Mar. 12, 2020).

(56) References Cited

OTHER PUBLICATIONS

U.S. Appl. No. 16/738,334, filed Jan. 9, 2020, Anette Hedlund.
U.S. Appl. No. 16/738,334, Hedlund et al.
International Search Report and Written Opinion, dated Feb. 15, 2019 in PCT/SE2018/051334, ISA/SE, Patent-och registreringsverket, Stockholm, SE, 10 pages.
Engstrand, Ola (Contact)/Valinge Innovation, Technical Disclosure entitled "Fibre Based Panels With a Wear Resistance Surface," Nov. 17, 2008, IP.com No. IPCOM000176590D, IP.com PriorArtDatabase, 76 pages.
Engstrand, Ola (Contact)/Valinge Innovation, Technical Disclosure entitled "WFF Embossing," May 15, 2009, IP.com No. IPCOM000183105D, IP.com PriorArtDatabase, 36 pages.
Engstrand, Ola (Contact)/Valinge Innovation, Technical Disclosure entitled "VA063 VA064 Scattering and Powder Backing," Nov. 11, 2011, IP.com No. IPCOM000212422D, IP.com PriorArtDatabase, 34 pages.
BTLSR Toledo, Inc. website. http://www.btlresins.com/more.html. "Advantages to Using Powdered Resins," May 26, 2007, 2 pages, per the Internet Archive WayBackMachine.
Fang, Chang-Hua, et al., "Densification of wood veneers by compression combined with heat and steam," *Eur. J. Wood Prod.*, 2012, pp. 155-163, vol. 70, Springer-Verlag, Germany (available online Feb. 1, 2011).
Floor Daily, "Shaw Laminates: Green by Design," Aug. 13, 2007, 1 pg, Dalton, GA.
Le Fur, X., et al., "Recycling melamine-impregnated paper waste as board adhesives," published online Oct. 26, 2004, pp. 419-423, vol. 62, Springer-Verlag, DE, XP055332791.
Lstiburek, Joseph, "BSD-106: Understanding Vapor Barriers," Apr. 15, 2011, *Building Science Corporation* pp. 1-18; (retrieved Sep. 26, 2018. https://buildingscience.com/documents/digests/bsd-106-understanding-vapor-barriers).
Mercene Labs, official home page, retrieved Feb. 23, 2017, 3 pages, retrieved from the Internet: http://www.mercenelabs.com/technology/, according to the Internet Archive WayBack Machine this page was available on Jan. 22, 2013.
Mercene Labs, "Technology," retrieved Mar. 28, 2020, 2 pages, retrieved from the Internet https://web.archive.org/web/20160324064537/http://www.mercenelabs.com/technology/ according to the Internet Archive WayBack Machine this page was available on Mar. 24, 2016 (XP055674254).
Mercene Labs, "Technology," retrieved Mar. 28, 2020, 2 pages, retrieved from the Internet https://web.archive.org/web/20150204025422/http://www.mercenelabs.com:80/technology/ according to the Internet Archive WayBack Machine this page was available on Feb. 4, 2015 (XP055674258).
Mercene Labs, "Industrial coatings," retrieved Mar. 28, 2020, 2 pages, retrieved from the Internet https://web.archive.org/web/20140825055945/http://www.mercenelabs.com/products/coating-of-difficult-substrates/ according to the Internet Archive WayBack Machine this page was available on Aug. 25, 2014 (XP055674250).
Nimz, H.H., "Wood," Ullmann's Encyclopedia of Industrial Chemistry, published online Jun. 15, 2000, pp. 453-505, vol. 39, Wiley-VCH Verlag GmbH & Co. KgaA, Weinheim, DE.
Odian, George, "Principles of Polymerization," 1991, $3^{rd}$ Edition, 5 pages incl. pp. 122-123, John Wiley & Sons, Inc., New York, NY, USA.
Parquet International, "Digital Printing is still an expensive process," Mar. 2008, cover page/pp. 78-79, www.parkettmagazin.com.
Hedlund, Anette, et al., U.S. Appl. No. 16/738,334 entitled "Method to Produce a Veneer Element and a Veneer Element," filed in the U.S. Patent and Trademark Office on Jan. 9, 2020.
Office Action issued in SE 1850031-4, dated Jul. 13, 2018, PRV-Swedish Patent and Registration office, 7 pages.
Bergelin, Marcus, et al., U.S. Appl. No. 17/038,567 entitled "Veneered Element and Method of Producing Such a Veneered Element," filed in the U.S. Patent and Trademark Office Sep. 30, 2020.
Schulte, Guido, U.S. Appl. No. 17/090,511 entitled "Floor, Wall, or Ceiling Panel and Method for Producing Same," filed in the U.S. Patent and Trademark Office Nov. 5, 2020.
Office Action issued in SE 1850032-2, dated Jul. 13, 2018, PRV-Swedish Patent and Registration Office, 30 pages.

* cited by examiner

METHOD TO PRODUCE A VENEERED ELEMENT

CROSS REFERENCE TO RELATED APPLICATIONS

The present application claims the benefit of Swedish Application No. 1850031-4, filed on Jan. 11, 2018. The entire contents of Swedish Application No. 1850031-4 are hereby incorporated herein by reference in their entirety.

TECHNICAL FIELD

The present application relates to a method to produce a veneered element, and such a veneered element.

TECHNICAL BACKGROUND

Floor coverings having a wooden surface may be of several different types. Solid wood floorings are formed of a solid piece of wood in form of a plank. Engineered wood floorings are formed of a surface layer of wood glued to a core. The core may be a lamella core or a wood-based panel, such as plywood, MDF or HDF. The wooden surface layer may, as an example, have a thickness of 2-10 mm.

A wooden floor covering may also be formed by gluing a wood veneer to a core, for example, a wood-based panel, such as particleboard, MDF or HDF. Wood veneer is a thin wood layer, for example having a thickness of 0.2-1 mm. A flooring with a separate surface layer glued to a core of, for example, HDF or plywood is more moisture stable than solid wood floorings.

Compared to solid wood and engineered wood floorings, wood veneer floorings can be produced to a lower cost since only a thin wood layer is used. However, a wood veneer layer cannot be sanded as a solid wood or engineered wood flooring can be.

As an alternative to wood floorings, laminate floorings are also available. Direct pressed laminated flooring usually comprises a core of a 6-12 mm fibre board, a 0.2 mm thick upper decorative surface layer of laminate and a 0.1-0.2 mm thick lower balancing layer of laminate, plastic, paper or like material.

A laminate surface conventionally comprises two paper sheets; a 0.1 mm thick printed decorative paper and a 0.05-0.1 mm thick transparent overlay intended to protect the decorative paper from abrasion. The transparent overlay, which is made of α-cellulose fibres, comprises small hard and transparent aluminium oxide particles, which gives the surface layer a high wear resistance.

The printed decorative paper and the overlay are impregnated with melamine resin and laminated to a wood fibre based core under heat and pressure. The two papers have prior to pressing a total thickness of about 0.3 mm and they are after pressing compressed to about 0.2 mm.

A wood veneer flooring may have a lower impact resistance than laminate floorings and the production cost is high, compared to laminate floorings, when high quality veneers are to be used.

Recently new "paper free" floor types have been developed with a solid surface comprising a substantially homogenous powder mix of fibres, binders and wear resistant particles. The mix is applied on a wood-based panel, such as MDF or HDF, and subsequently heat and pressure are applied to the mix to form a surface layer on the panel, as disclosed in WO 2009/065769. Such a surface layer is marketed under the trademark NADURA®.

WO 2009/065769 also discloses a thin surface layer, such as wood veneer layer, which is applied on a sub-layer comprising, for example, cork or wood fibres mixed with a binder. The sub-layer is applied on wood fibre based core.

U.S. Pat. No. 2,831,794 discloses a process for manufacturing veneer panels. A green veneer is applied on a mat of resin coated core particles of ligno-cellulose fibrous particles. Adhesive is applied on the veneer to bond the veneer to the fibrous core, and to form a dense surface zone in the fibrous core. The material of the core serves to fill knot holes or open flaws in the veneer. When heat and pressure are applied, the result is the formation of a panel, wherein the resin coated core particles fill whatever flaws or holes that would otherwise be present in the veneer.

U.S. Pat. No. 2,419,614 discloses a coated wood product wherein a plywood is coated by a covering or overlay material consisting of mixtures of sawdust and synthetic resin. The veneer layer is coated by the covering or overlay material such that the veneer is no longer visible. The covering forms the uppermost layer of the product.

WO 2015/105455 discloses that holes and cracks of a wood veneer can be filled with material from a sub-layer comprising wood fibres and a binder during pressing. Thereby, a wood veneer of lower quality can be used.

WO 2015/105456 discloses a method of controlling permeation of a sub-layer through a wood veneer during pressing. Thereby, the design of the wood veneer after pressing can be controlled, by controlling the degree of permeation of materials from the sub-layer through the wood veneer.

In the above description, the different types of products have been described with reference to floorings. However, the same material and problems apply for other types of building panels, such as wall panels, ceiling panels, and for furniture components.

SUMMARY

It is an object of at least embodiments of the present invention to provide an improvement over the above described techniques and known art.

A further object of at least embodiments of the present invention is to provide improved designs of veneer layers.

A further object of at least embodiments of the present invention is to further control the design of a veneer layer after pressing.

A further object of at least embodiments of the present invention is to provide a veneer layer with defects, such as holes, cracks and knots, filled with material from a layer arranged below the veneer layer without affecting other portions of the veneer layer.

At least some of these and other objects and advantages that will be apparent from the description have been achieved by a method to produce a veneered element according to a first aspect of the invention. The method comprises applying a first layer on a substrate, applying a second layer on a veneer layer, applying the veneer layer with the second layer applied thereto on the first layer such that the second layer is facing the first layer, pressing the first layer, the second layer and the veneer layer together to form a veneered element, thereby material originating from the second layer permeates into the veneer layer, and wherein, after pressing, the first layer is visible through a defect, such as a crack, cavity, hole and/or knot, of the veneer layer.

Defect includes any crack, cavity, hole and/knot in the veneer layer. A defect may include any portion of the veneer layer not being solid and/or dense. Dense portions of the wood veneer are the portions of the veneer layer, where there are no visible by eye defects, i.e. macroscopic defects, such as cracks, cavities, holes and/or knots.

Cracks, cavities, holes and/knots may also be desired and formed during the production process, and thus forming desired defects of the veneer layer.

An advantage of at least embodiments of the first aspect is that the design of the veneer layer element can be further controlled by applying the veneer layer on two layers having different properties. The formulation of the first layer may be different from the formulation of the second layer. For example, the first layer may be pigmented or dyed, and the second layer may be free from pigments and/or dyes. As another alternative, the first layer may have a colour being different from the colour of the second layer. Thereby, the design of the veneer after pressing can be controlled.

During pressing, material from the second layer permeates at least partly into the veneer layer and/or through the veneer layer. The second layer, at least partly permeating into the veneer layer, at least partly or completely prevents the first layer from permeating into or through the veneer layer, as compared to an embodiment wherein only a single layer is provided. However, in any defect of the veneer layer, such as cracks, cavities, holes and/or knots, the first layer is visible through any crack, cavity, hole and/or knot.

Permeating means that the second layer is diffuses or penetrates into the microscopic structure of the veneer layer, the structure not visible by the eye, such as wood pores.

Thereby, defects, such as cracks, cavities, holes and knots, are visible and filled with material from the first layer. For example, the first layer may be coloured in a darker colour than the colour of the veneer layer. Thereby, defects, such as cracks, cavities, holes and knots, are visible and coloured with a dark colour.

Thereby, when the first layer is seen through the defects such as cracks, cavities holes and/or knots, the defects are seen as having a colour of the first layer.

At the same time, dark colored particles from the first layer at least partially prevented from permeating into the dense part of the veneer layer by the second layer. Thereby, the undesired coloring of the dense parts of the veneer layer is at least partially prevented while the defects are perceived as dark colored. Thereby the veneer layer has more aesthetica) appearance, which is more appealing to a consumer.

However, for some designs, it may be undesired to change the design of the veneer layer itself by permeating coloured material through portions of the veneer layer other than defects, such as through solid parts of the veneer layer, i.e., dense parts of the veneer. By arranging the second layer on the first layer, the veneer layer is permeated by the second layer instead, and the second layer may at least partly prevent the first layer from permeating into the veneer layer. Thereby, the veneer layer may be substantially unaffected by the first layer after pressing. For example, by using a second layer being substantially free from pigments of dyes, permeation of the second layer through the veneer layer results in substantially no change of the design of the veneer layer, or at least a less visible change of the design of the veneer layer. Thereby, defects, such as knots, holes and cracks, are visible and filled with material having one colour, and the rest of the veneer layer remains substantially unaffected.

As another example, the second layer may have different colour than the first layer, such that any defect, such as a knot, hole and crack, have one colour (primarily from the first layer) and material permeating into the veneer layer has another colour (primarily from the second layer). Thereby, the veneer layer may be stained in one colour (primarily from the second layer), for example with a light colour or a colour corresponding to a natural colour of the veneer layer, and defects, such as knots, holes and cracks, may have a different colour after pressing, for example a dark colour (primarily from the first layer).

The veneer layer may be or comprise a wood veneer or a cork veneer.

During pressing, a crack, cavity, hole and/or knot of the veneer layer may be at least partially filled with material originating from the first layer. Preferably, the material filling defect, such as a crack, cavity, hole and/or knot, is flush with an upper surface of the veneer layer after pressing.

During pressing, material originating from the second layer may permeate into the veneer layer. That is, permeating into the material of the veneer, as opposed to filling in a defect. The material originating from the second layer may permeate into the veneer layer and/or through the veneer layer. During pressing, the second layer may prevent material originating from the first layer from permeating into and/or through the veneer layer. Thereby, the veneer layer, except any defects, may remain substantially unaffected by material originating from the first layer after pressing.

Applying the second layer on the veneer layer may comprise applying a liquid on the veneer layer, and subsequently applying a dry powder on the veneer layer for forming the second layer.

The second layer may be applied as a slurry.

No or substantially no second layer may be attached to at a crack, cavity, hole and/knot of the veneer layer.

The first layer may comprise pigments and/or dyes.

The first layer may have a substantially uniform colour. The first layer may be substantially uniformly coloured over its horizontal extension. The first layer may be substantially uniformly coloured in its vertical extension.

The second layer may have a substantially uniform colour. The second layer may be substantially uniformly coloured over its horizontal extension. The second layer may be substantially uniformly coloured in its vertical extension.

The second layer may be free from pigments and dyes.

After pressing, the second layer may be transparent, or at least translucent.

The second layer may have a different colour than the first layer after pressing. The second layer may stain the veneer layer after pressing.

The second layer may comprise pigments and/or dyes.

The first layer may comprise a thermosetting binder. The thermosetting binder may be an amino resin, for example, melamine formaldehyde, urea formaldehyde, or a combination or co-polymer thereof.

The second layer may comprise a thermosetting binder. The thermosetting binder may be an amino resin, for example, melamine formaldehyde, urea formaldehyde, or a combination or co-polymer thereof.

In one embodiment, the first layer and/or the second layer may comprise thermoplastic binder.

The first layer may be applied as a dry powder. For example, the binder of the first layer may be applied as a dry powder. Alternatively, the first layer may be applied in liquid form, for example by applying the binder in liquid form.

The second layer may be applied as a dry powder. For example, the binder of the second layer may be applied as a dry powder. Alternatively, the second layer may be applied in liquid form, for example by applying the binder in liquid form.

The second layer may be applied in an amount of 5-200 g/m2. By applying at least 5-200 g/m2, the second layer may prevent the first layer from permeating into the veneer layer during pressing. If the second layer is applied in powder form, the second layer may be applied in an amount of at least 50 g/m2, preferably at least 100 g/m2. If the second layer is applied in liquid form, the second layer may be applied in an amount of 10-100 g/m2, preferably 20-50 g/m2.

The first and/or the second layer may further comprise fillers. The fillers may be particles or fibres, for example wood fibres or particles, or mineral particles or fibres. The wood particles may be lignocellulosic particles and/or cellulosic particles. The wood particles may be at least partially bleached.

The first and/or the second layer may comprise wear resistant particles and/or scratch resistant particles. Preferably, at least the second layer comprises wear resistant particles and/or scratch resistant particles.

The first layer may comprise a paper sheet, preferably a resin impregnated paper sheet. In an embodiment wherein the first layer comprises a paper sheet, the paper sheet may be coloured. In an embodiment wherein the second layer comprises a paper sheet, the paper sheet may be an overlay sheet, for example of the type used for laminate flooring. After pressing, such an overlay sheet is transparent. The first layer may comprise a thermoplastic sheet.

The substrate may comprise a wood-based board such MDF, HDF, particleboard, a thermoplastic board, a plywood, a lamella core, a veneer layer, such as a wood veneer or cork veneer, a sheet, such as paper sheet, a non-woven, or a conveyor. In one embodiment, the substrate may be included in the veneered element after pressing, by pressing, the substrate, the first layer, the second layer and the veneer layer together. In one embodiment, the veneered element may be removed from the substrate after pressing.

According to a second aspect of the present invention, a veneered element is provided. The veneered element comprises a substrate, a first layer arranged on the substrate, a second layer arranged on the first layer, and a veneer layer arranged on the second layer, wherein the first layer is visible through a hole, crack and/or knot of the veneer layer, and wherein material originating from the second layer is present in the veneer layer.

Embodiments of the second aspect of the present invention incorporates all the advantages of the first aspect of the invention, which previously has been discussed, whereby the previous discussion is applicable also for the veneered element.

The veneer layer may be or comprise a wood veneer or a cork veneer.

No material originating from the second layer may be present at a hole, crack or knot of the veneer layer.

The crack, cavity, hole and/or knot of the veneer layer may be at least partially filled with material originating from at least the first layer. Preferably, the material filling defects as a crack, cavity, hole and/or knot is flush with an upper surface of the veneer layer.

The second layer may be adapted to prevent material originating from the first layer from may permeate into and/or through the veneer layer. Thereby, the veneer layer, except any defects, may remain substantially unaffected by material from the first layer after pressing.

The second layer may be transparent or translucent. In the context of the present invention translucent means that the second layer allowing light, but not detailed shapes, to pass through; semi-transparent.

The first layer may comprise pigments and/or dyes.

The first layer may have a substantially uniform colour. The first layer may be substantially uniformly coloured over its horizontal extension. The first layer may be substantially uniformly coloured in its vertical extension.

The second layer may have a substantially uniform colour. The second layer may be substantially uniformly coloured over its horizontal extension. The second layer may be substantially uniformly coloured in its vertical extension.

The second layer may be free from pigments and dyes.

The second layer may have a different colour than the first layer after pressing. The second layer may stain the veneer layer after pressing.

The first layer may comprise a thermosetting binder. The thermosetting binder may be an amino resin, for example, melamine formaldehyde, urea formaldehyde, or a combination or co-polymer thereof.

The second layer may comprise a thermosetting binder. The thermosetting binder may be an amino resin, for example, melamine formaldehyde, urea formaldehyde, or a combination or co-polymer thereof.

In one embodiment, the first layer and/or the second layer may comprise a thermoplastic binder. The first layer may comprise thermoplastic foil.

The first and/or the second layer may further comprise fillers. The fillers may be particles or fibres, for example wood fibres or particles, or mineral particles or fibres. The wood particles may be lignocellulosic particles and/or cellulosic particles. The wood particles may be at least partially bleached.

The first and/or the second layer may comprise wear resistant particles and/or scratch resistant particles. Preferably, at least the second layer comprises wear resistant particles and/or scratch resistant particles.

The first layer may comprise a paper sheet, preferably a resin impregnated paper sheet. In an embodiment wherein the first layer comprises a paper sheet, the paper sheet may be coloured. In an embodiment wherein the second layer comprises a paper sheet, the paper sheet may be an overlay sheet, for example of the type used for laminate flooring. After pressing, such an overlay sheet is transparent.

The substrate may comprise a wood-based board, such as MDF, HDF, particleboard, a thermoplastic board, a plywood, a lamella core, a veneer layer, such as a wood veneer or cork veneer, a sheet, such as paper sheet, a non-woven, or a conveyor. In one embodiment, the substrate may be included in the veneered element after pressing, by pressing, the substrate, the first layer, the second layer and the veneer layer together. In one embodiment, the veneered element may be removed from the substrate after pressing.

According to a third aspect of the invention, a method to produce a veneered is provided. The method may comprise applying a first layer on a substrate, applying a liquid on a veneer layer including cracks, cavities, holes and/or knots, subsequently applying a dry powder on the veneer layer, pressing the substrate, the first layer and the veneer layer with the dry powder together for forming a veneered element.

Embodiments of the third aspect of the present invention may incorporate all the advantages of the first aspect of the invention, which previously has been discussed, whereby the previous discussion is applicable also for the veneered element.

BRIEF DESCRIPTION OF THE DRAWINGS

Embodiments of the present invention will by way of example be described in more detail with reference to the appended schematic drawings, which show embodiments of the present invention.

DETAILED DESCRIPTION

Figure 1A:
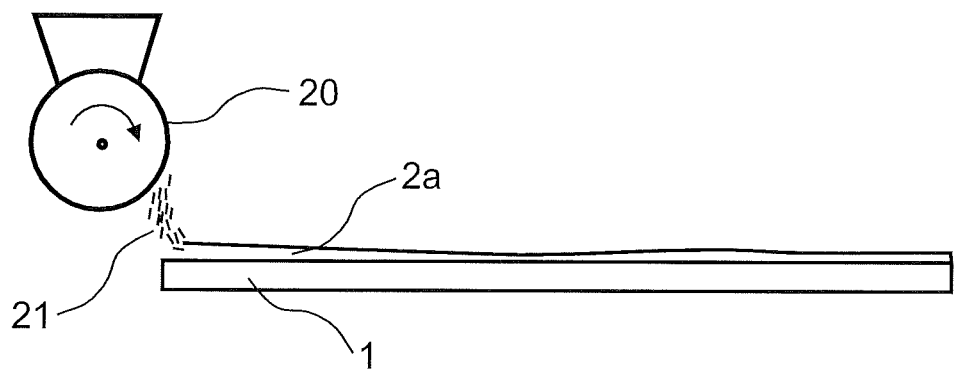
FIGS. 1A-1C illustrates a method of a producing a veneered element according to an embodiment.
Figure 1B:
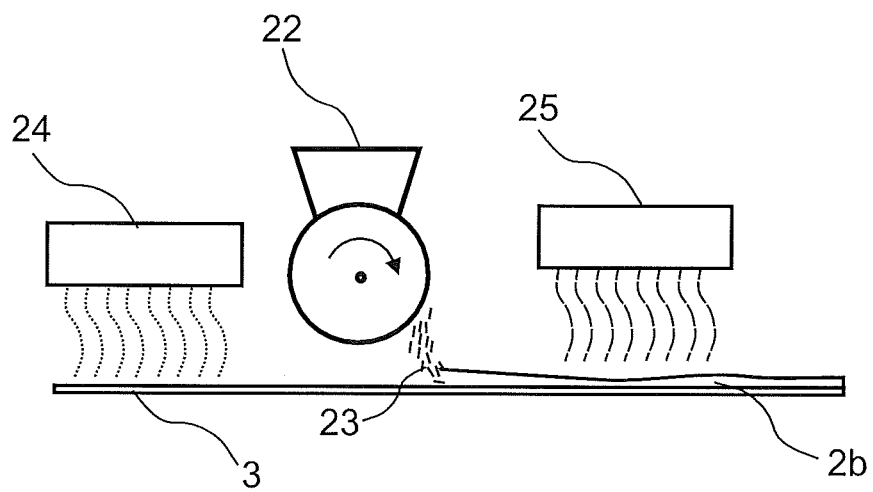
Figure 1C:
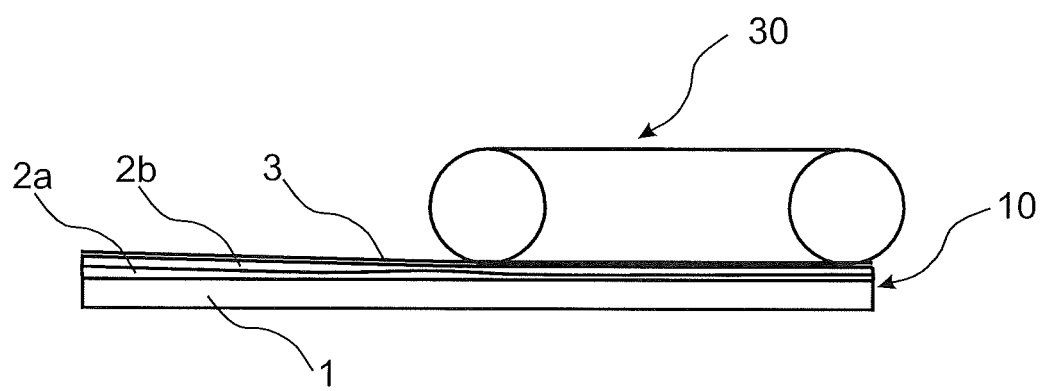

FIGS. 1A-1C show a method of producing a veneered element 10. The veneered element 10 may be a furniture component, a building panel, such as a floor panel, a ceiling panel, a wall panel, a door panel, a worktop, skirting boards, mouldings, edging profiles, etc. The method comprises providing a substrate 1. The substrate 1 is preferably a pre-fabricated substrate, manufactured prior to the method of producing the veneered element 10. The substrate 1 may be a board, for example, a wood-based board as shown in the embodiment shown in FIGS. 1-3. The wood-based board may be a wood fibre based board, such as MDF, HDF, particleboard, etc., or a plywood board. In other embodiments, the substrate 1 may be a Wood Plastic Composite (WPC). The substrate 1 may be a mineral composite board. The substrate 1 may be a fibre cement board. The substrate 1 may be magnesium oxide cement board. The substrate 1 may be a ceramic board. The substrate 1 may be a plastic board, such as a thermoplastic board. In another embodiment, the substrate 1 may be a carrier, such as sheet of paper, a veneer layer, or non-woven, or a conveyor. The carrier may be a resin impregnated sheet, such as a resin impregnated paper.

In FIG. 1A, a first layer 2a is applied on a first surface of the substrate 1. In the embodiment shown in FIG. 1A, the first layer 2a is applied in powder form 21. The powder 21 adapted to form the first layer 2a is applied by scattering, as shown in FIG. 1A, for example by a scattering device 20. The first layer 2a may also be applied as granules. In other embodiments, the first layer 2a may be applied as a liquid, as a paste, a sheet, etc. The first layer 2a may be applied by roller coating, spraying, etc.

In the context of the present invention powders are finally divided chemicals in a dry form, more precisely subdivided solids containing constituent individual particles.

In the context of the present invention granules are typically understood as aggregation of fine particles to form larger particles.

In one embodiment (not shown), the first layer 2a comprises a sheet impregnated with a thermosetting binder. The sheet may be paper sheet. The sheet may be coloured, and/or the binder solution used to impregnate the sheet may be coloured, such that sheet becomes coloured during impregnation.

The first layer 2a comprises pigments and/or dyes. Preferably, pigments and/or dyes may be darker than the natural colour of the veneer layer which is to be applied later in the process. The first layer 2a preferably has a uniform colour. The first layer 2a is preferably uniformly coloured in the horizontal direction. The first layer 2a is preferably uniformly coloured in the vertical direction.

Moisture may be applied to the first layer 2a. The first layer 2a may be dried, for example, by applying IR or NIR.

In FIG. 1B, a liquid or moisture is applied on a veneer layer 3. The veneer layer 3 may be a wood veneer or a cork veneer. The veneer has a porous structure, thus being permeable. The veneer layer 3 may have a thickness of about 0.2 to 1 mm. The veneer layer 3 may be continuous or non-continuous. The veneer layer 3 may be formed of several veneer pieces. The veneer pieces may be overlapping or non-overlapping. A gap may be formed between the veneer pieces.

The veneer layer 3 may comprise defects 6, such as holes, knots and/or cracks. By defects are meant both naturally occurring defects in the veneer, such as holes, cavities, knots and/or cracks, and defects, such as holes, cavities, knots and/or cracks, formed by, for example, abrasive machining, punching, tearing, brushing, stretching, etc., prior to pressing.

The liquid may be water, a solvent, a binder, etc. The liquid may be applied by a spraying device 24.

In a subsequent step, a second layer 2b is applied on the veneer layer 3. In the embodiment shown in FIG. 1B, the second layer 2b is applied in powder form 23. The powder 23 adapted to form the second layer 2b is applied by scattering, as shown in FIG. 1A, for example by a scattering device 22. The second layer 2b may also be applied as granules. In other embodiments, the second layer 2b may be applied as a liquid, as a paste, a sheet, etc. The second layer 2b may be applied by roller coating, spraying, etc.

Since a liquid or moisture has been applied to the veneer layer 3, the second layer 2b applied in powder form will adhere to dense parts of the veneer layer 3. However, no or substantially no powder will adhere to any crack, cavity, hole and/or knot of the veneer layer 3, since there is no material to adhere to. The cracks, cavities, holes and/or knots are cavities in the veneer layer 3, thus lacking the ability to adhere to powder of the second layer 2b. Thereby, the second layer 2b is present only at the solid/dense portions of the veneer layer 3. No or substantially no second layer 2b is present at any crack, cavity, hole and/or cavity of the veneer layer 3.

The second layer 2b arranged at the veneer layer 3 may be stabilized, for example by applying IR or NIR. Thereafter, the veneer layer 3 with the second layer 2b adhered thereto may be handled, for example, stacked in sheets or rolled to a continuous roll.

In one embodiment, the second layer 2b is free from pigments and dyes. The second layer 2b may be uncoloured.

In one embodiment, the second layer 2b comprises pigments and/or dyes. The colour of the second layer 2b may be different from the colour of the first layer 2a. The colour of the second layer 2b may be adapted to stain the veneer layer 3.

The first layer 2a and the second layer 2b comprises a binder. The binder may be a thermosetting binder, a thermoplastic binder, or a combination thereof. The binder may be wood mastic, wood filler or any other type of putty-like paste. The thermosetting binder may be an amino resin, such as melamine formaldehyde resin, phenol formaldehyde resin, urea formaldehyde resin, or a combination thereof. Urea formaldehyde resin may be used, alone or in combination with melamine formaldehyde resin, to reduce tension formed by the first layer 2a and/or the second layer 2b during curing, compared to when melamine formaldehyde resin is used only. The thermoplastic binder may be polyvinyl chloride (PVC), polyethylene (PE), polypropylene (PP), polyurethane (PU), polyvinyl alcohol (PVOH), polyvinyl butyral (PVB), polyvinyl acetate (PVAc), and/or thermoplastic elastomer (TPE), or a combination thereof.

The binder described above may be in powder form when applied.

In one embodiment, the first layer 2a comprises urea formaldehyde resin, and the second layer comprises melamine formaldehyde resin. Melamine formaldehyde resin flows more than urea formaldehyde resin, which may result in permeation, but gives good transparency.

In one embodiment, the second layer 2b comprises urea formaldehyde resin, and the first layer 2a comprises melamine formaldehyde resin. Urea formaldehyde resin flows less than melamine formaldehyde resin. In order to improve the transparency of the urea formaldehyde resin, the binder may be applied in liquid form.

In one embodiment, both the first and the second layer comprise urea formaldehyde resin.

The first layer 2a and/or the second layer 2b may be formed of a mix comprising a binder of the above described type and fillers. The mix may further comprise pigments as described above. The mix may further comprise additives. The mix may further comprise wear and/or scratch resistant particles. As an alternative to a mix, the binder, fillers, pigments, additives and any other component may be applied separately on the substrate 1.

The fillers may be particles or fibres, for example wood fibres or particles, or mineral particles or fibres. The wood particles may be lignocellulosic particles and/or cellulosic particles. The wood particles may be at least partially bleached. The fillers may be rice, straw, corn, jute, linen, flax, cotton, hemp, bamboo, bagasse or sisal particles or fibres. The first and/or the second layer 2a, 2b may comprise starch, such as maize starch, potato starch, etc.

If the second layer 2b comprise wood fibres or particles, the fibres or particles are preferably at least partially bleached.

The fillers may be fillers having sound-absorbing properties, such as cork particles and/or barium sulphate (BaSO4).

The additives may be wetting agents, anti-static agents, such as carbon black, and heat-conducting additives, such as aluminium. Other possible additives are magnetic substances.

The first layer 2a and/or the second layer 2b may also comprise a foil or a sheet.

Additives, such as blowing agents may be included in the first and/or second layers 2a, 2b. The blowing agents may be physical foaming agents, such as EXPANCEL®, and/or chemical blowing agents, such as AIBN (azoisobutyronitrile) or ADC (azodicarbonamide).

The first layer 2a may comprise a blowing agent for improving filling of any cracks, cavities, holes and/or cavities.

The wear and/or scratch resistant particles may be aluminium oxide particles and/or silica particles.

In one embodiment, the first layer 2a and/or the second layer 2b consists essentially of the binder and optionally additives, meaning that at least 90 wt % of the first and/or second layer 2a, 2b is the binder and optional additive(s). In one embodiment, the first layer 2a and/or the second layer 2b is free from any fibres and/or fillers. Additives may be but not limited to wetting agents, anti-static agents, such as carbon black, heat conductive additives such as aluminum; magnetic substances; blowing agents, such as physical foaming agents (for example, EXPANCEL® or chemical blowing agents such as AIBN (azoisobutyronitrile) or ADC (azodicarbonamide); catalysators.

The first layer 2a may be applied in an amount of 100-300 g/m2, preferably 150-250 g/m2, such as about 200 g/m2. The amount of binder applied for the first layer 2a may be 50-150 g/m2, preferably 75-125 g/m2, such as about 100 g/m2. The first layer 2a may comprise the binder in an amount of 30-80 wt %, preferably in an amount of 40-60 wt %, such as about 50 wt %.

The second layer 2b may be applied in an amount of 100-300 g/m2, preferably 150-250 g/m2, such as about 200 g/m2 if applied in powder form. The amount of binder applied in powder form for the second layer 2b may be 50-150 g/m2, preferably 75-125 g/m2, such as about 100 g/m2. The second layer 2b may comprise the binder in an amount of 30-80 wt %, preferably in an amount of 40-60 wt %, such as about 50 wt %.

In liquid form, the second layer may be applied in an amount of 5-100 g/m2.

The first layer 2a may be pre-pressed prior to applying the wood veneer layer 3 with the second layer 2b adhered thereto. The veneer layer 3 with the second layer 2b may be pre-pressed prior to pressing.

In FIG. 1C, the veneer layer 3 with the second layer 2b adhered to thereto is arranged on the first layer 2a, arranged on the substrate 1. The first layer 2a is facing the second layer 2b.

A balancing layer may also be applied on a lower surface of the substrate 1. The balancing layer may be a powder based balancing layer being applied as a powder. The powder based balancing layer may comprise wood particles, such as lignocellulosic and/or cellulosic particles and a binder, preferably a thermosetting binder, such as an amino resin. The balancing layer may be a resin impregnated paper, preferably impregnated with a thermosetting binder. The balancing layer may comprise a veneer layer, such as a wood veneer or cork veneer. The balancing layer may comprise a veneer layer, such as wood veneer or cork veneer arranged on a sub-layer comprising wood particles, such as lignocellulosic and/or cellulosic particles and a binder, preferably a thermosetting binder, such as an amino resin.

As shown in FIG. 1C, when the veneer layer 3 with the second layer 2b adhered thereto is arranged on the first layer 2a, arranged on the substrate 1, pressure is applied to the veneer layer 3 and/or the substrate 1. The pressure may be applied by continuous press 30 or in a discontinuous press (not shown). Preferably, heat is also applied.

Figure 2:
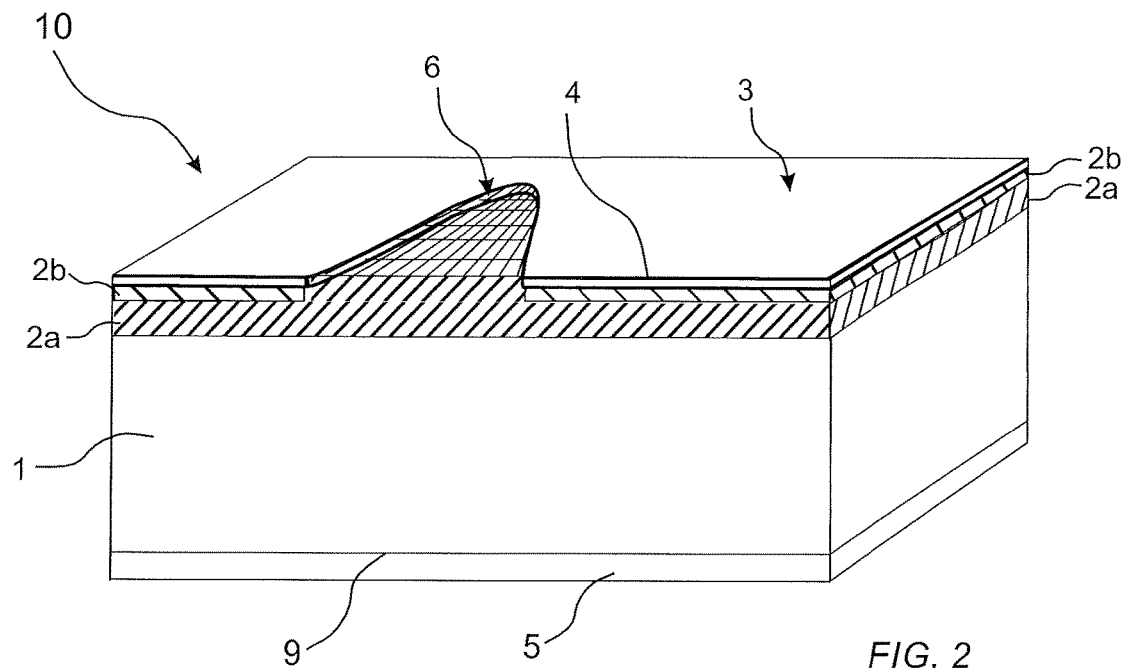
FIG. 2 illustrates a cross-section of an embodiment of a veneered element.
Figure 3:
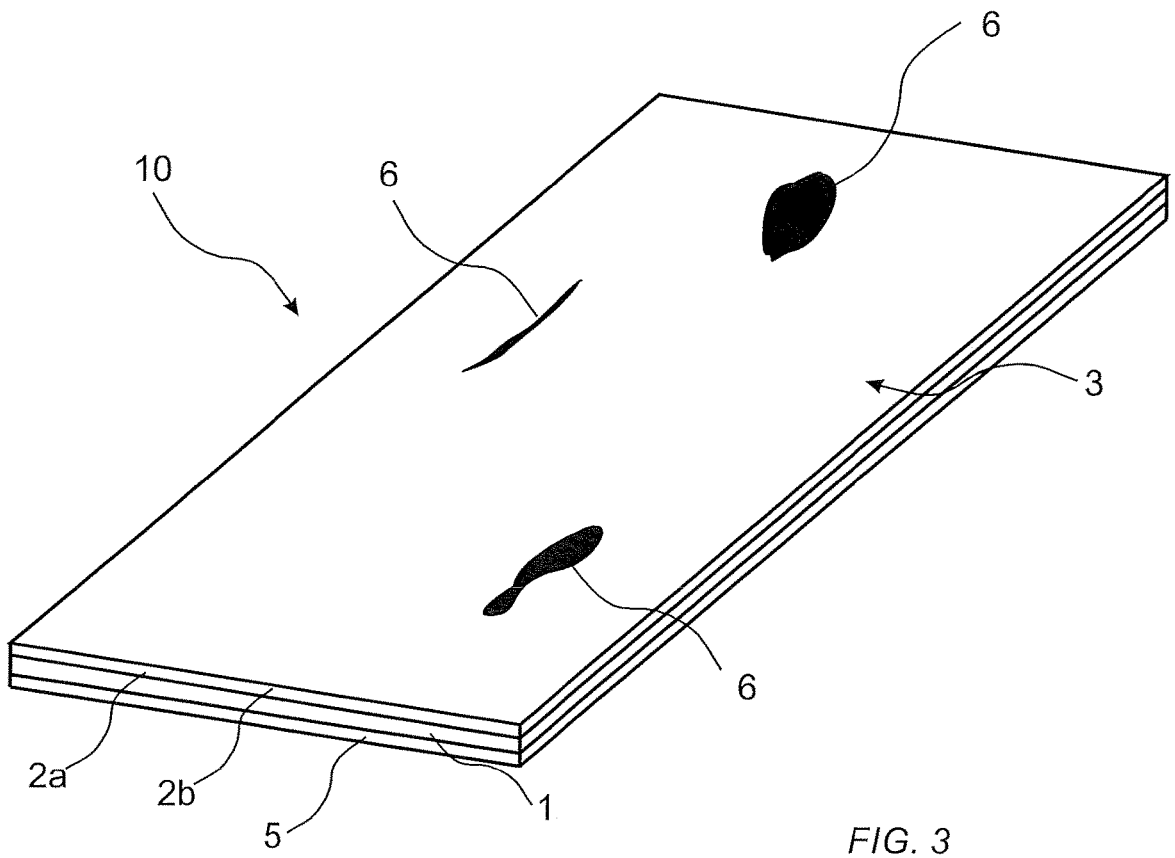
FIG. 3 illustrates an embodiment of a veneered element.

After pressing, a veneered element 10 is formed, as shown in FIGS. 2 and 3. In one embodiment, the veneer layer 3, the first and second layers 2a, 2b, and the substrate 1 are pressed together such that the veneered element 10 includes the substrate 1. In other embodiments, the veneered element 10 is removed from the substrate 1 after pressing.

After pressing, the second layer 2b may be transparent or at least translucent. The second layer 2b may be coloured or stained, but may remain at least translucent. The second layer 2b may be transparent after pressing by having a high binder content. If the second layer 2b comprises wood fibres or particles, the wood fibres or particles are preferably cellulosic fibres or particles. The wood fibres or particles are preferably at least partially bleached.

During pressing, material from the second layer 2b may permeate through the veneer layer 3. Material from the second layer 2b may permeate partially through the veneer layer 3 or completely through the veneer layer 3.

After pressing, defects 6, such as holes, knots and cracks are filled with material from the first layer 2a, as shown in FIGS. 2 and 3. Preferably, defects 6, such as holes, knots and cracks, are filled with material from the first layer 2a. Preferably, material from the first layer 2a is flush with an upper surface 4 of the veneer layer 3.

During pressing, the second layer 2b, arranged on the first layer 2a, prevents the first layer 2a from at least from completely permeating through solid/dense parts of the veneer layer 3. Thereby, the veneer layer 3 remains substantially unaffected by the first layer 2a. However, at defects 6 of the veneer layer 3, such as holes, knots and cracks, the first layer 2a fills defects 6, such as holes, knots and cracks. Thereby, it is possible to obtain a visible design of the veneer layer 3 wherein defects 6, such as holes, knots and cracks, of the veneer layer are coloured with a darker colour than the rest of the veneer layer 3. The rest of the veneer layer remains substantially unaffected by the first layer 2a, such that the veneer layer 3 is not coloured by the first layer 2a. By substantially unaffected is meant compared to how an appearance the veneer layer 3 would have after pressing if being arranging on the first layer 2a only.

In one embodiment, the second layer 2b is free from any pigments and/or dyes. Thereby, the veneer layer 3 is not coloured by any pigments or dyes from the second layer 2b after pressing. The veneer layer 3 will only be affected by, for example by the binder of the second layer 2b. After pressing, the veneer layer 3 has its original appearance, or at least substantially its original appearance, while any defects 6, such as knots, holes and cracks, will be visible and filled with material having the colour of the first layer 2a.

In one embodiment, the second layer 2b comprises pigments and/or dyes. Preferably, the colour of the second layer 2b is different from the colour of the first layer 2a. Thereby, solid/dense parts of the veneer layer 3 may be coloured by one colour (primarily the color of the second layer) after pressing by the permeation of the second layer 2b during pressing, while any defects 6, such as knots, holes and cracks, will be visible and coloured in a different colour (primarily the color of the first layer), due to the first layer 2a filling or at least partially filling the defects 6.

Depending on several parameters, such as binder concentration, in the first and second layers 2a, 2b, moisture content in the first and second layers 2a, 2b, pressure applied, gas pressure and filler concentration in the first and second layers 2a, 2b, and depending on the thickness of the veneer layer, permeation of the first and the second layer 2a, 2b can be controlled. By controlling these parameters, the degree of permeation of the first layer 2a and/or the second layer 2b through the veneer layer can be controlled.

For example, in one embodiment wherein the first layer 2a comprises urea formaldehyde as the binder, and the second layer 2b comprises urea formaldehyde as the binder, the first layer 2a is prevented from permeating through the veneer layer 3 by the second layer 2b. Thereby, after pressing, the solid/dense parts of the veneer layer 3 remains unaffected from permeation of material from the first layer 2a.

In one embodiment wherein the first layer 2a comprises urea formaldehyde resin as the binder, and the second layer 2b comprises melamine formaldehyde as the binder, the first layer 2a is not completely prevented from permeating through the veneer layer 3 by the second layer 2b. In this embodiment, some material from the first layer 2a may permeate through the veneer layer 3, due to the melamine formaldehyde resin of the second layer 2b flowing more compared to urea formaldehyde resin during pressing.

In the embodiment shown in FIGS. 2 and 3, a balancing layer 5 is provided on a lower surface 9 of the substrate 1. The balancing layer 5 may be a powder based balancing layer being applied as a powder. The powder based balancing layer may comprise wood particles, such as lignocellulosic and/or cellulosic particles, and a binder, preferably a thermosetting binder, such as an amino resin. The balancing layer 5 may be a resin impregnated paper, preferably impregnated with a thermosetting binder. The balancing layer 5 may comprise a veneer layer, such as a wood veneer or cork veneer. The balancing layer 5 may comprise a veneer layer, such as wood veneer or cork veneer arranged on a sub-layer comprising wood particles, such as lignocellulosic and/or cellulosic particles, and a binder, preferably a thermosetting binder, such as an amino resin.

In the embodiment shown in FIGS. 2 and 3, the substrate 1 is a board, such as a wood-based board, a particleboard, a thermoplastic board, a plywood, a lamella core, etc. In other embodiments, the substrate may be a sheet, such as paper sheet, a non-woven, or a veneer layer, such as a wood veneer layer or a cork veneer layer.

Furthermore, a protective layer (not shown) may be applied to the veneer layer 3. The protective layer may be a coating, such as one or several lacquer layers. The coating may be an acrylate or methacrylate coating, such as polyurethane coating. The coating may comprise wear and/or scratch resistant particles. The protective layer may be an overlay paper comprising wear resistant particles. The protective layer may be a powder overlay, as described in WO 2011/129755, comprising processed wood fibres, a binder and wear resistant particles applied as mix on the veneer surface. If the protective layer comprises or is an overlay paper or a powder overlay, the protective layer is preferably applied before the step of applying heat and pressure. Thereby, the protective layer is cured and attached to the veneer layer in the same step as attaching the veneer layer 3 to the first and second layers 2a, 2b and to the substrate 1.

The veneered element 10 may further be treated in different ways, for example brushed, oiled, lacquered, waxed, etc.

A protective coating (not shown) may also be applied to the veneer layer 3 prior to pressing. In one embodiment, a wax powder is applied, for example, scattered, on the upper surface of the veneer layer, facing away from the substrate 1, prior to pressing. During pressing, the wax powder forms a protective coating of the veneered element 10.

A protective foil (not shown) may also be applied on the veneer layer 3 prior or after pressing. The protective foil may be thermoplastic foil, such as PU or PVC foil.

In the figures, the first layer 2a and the second layer 2b are shown as two separate layers. However, after pressing, the first layer 2a and the second layer 2b may flow into each other such that no border between the layers exists.

It is contemplated that there are numerous modifications of the embodiments described herein, which are still within the scope of the invention as defined by the appended claims. When the word "about" is used in this specification in connection with a numerical value, it is intended that the associated numerical value include a tolerance of +/−10% around the stated numerical value.

EXAMPLE 500 g/m2 of a powder composition comprising a dry mixture of wood powder, melamine formaldehyde resin and brown pigments was scattered on a HDF board for forming a first layer. A 0.6 mm oak veneer comprising large holes and cracks was sprayed with 25 g/m2 of water. 100 g/m2 of a powder composition comprising a dry mixture of wood powder, melamine formaldehyde resin and black pigments were scattered on the wet veneer for forming a second layer.

The veneer was positioned on top of the HDF board, the first and the second powder layers facing each other.

The HDF board and the veneer was heat pressed at 160° C. for 30 seconds using a pressing force of 40 bars, resulting in a veneered element wherein the black powder composition forming the second layer was visible in the tiny cracks and pores of the veneer and wherein the brown powder composition forming the first layer was visible in the large holes and cracks of the veneer.

Embodiments

1. A method to produce a veneered element, the method comprising
applying a first layer on a substrate,
applying a second layer on a veneer layer,
applying the veneer layer with the second layer applied thereto on the first layer such that the second layer is facing the first layer,
pressing the first layer, the second layer and the veneer layer together to form a veneered element, thereby material originating from the second layer permeates into the veneer layer, and
wherein, after pressing, the first layer is visible through at least one defect such as defect of the veneer layer.

2. A method according to embodiment 1, wherein, during pressing, the defect of the veneer layer is at least partially filled with material originating from the first layer.

3. A method according to embodiment 1 or 2, wherein applying the second layer on the veneer layer comprises applying a liquid on the veneer layer, and subsequently applying a dry powder on the veneer layer for forming the second layer.

4. A method according to embodiment 1 or 2, wherein the second layer is applied as a slurry.

5. A method according to any one of the preceding embodiments, wherein no second layer is attached to a defect of the veneer layer, such as the defect of the veneer layer.

6. A method according to any one of the preceding embodiments, wherein, during pressing, the second layer prevents material originating from the first layer from permeating into the veneer layer.

7. A method according to any one of the preceding embodiments, wherein the first layer comprises pigments and/or dyes.

8. A method according to any one of the preceding embodiments, wherein the first layer has a substantially uniform colour.

9. A method according to any one of the preceding embodiments, wherein the second layer is free from pigments and dyes.

10. A method according to any one of embodiments 1-7, wherein, after pressing, the second layer has a different colour than the first layer.

11. A method according to any one of the preceding embodiments, wherein the second layer is transparent or translucent after pressing.

12. A method according to any one of the preceding embodiments, wherein the first layer comprises a thermosetting binder.

13. A method according to any one of the preceding embodiments, wherein the second layer comprises a thermosetting binder.

14. A method according to any one of the preceding embodiments, wherein the first layer is applied as a dry powder.

15. A method according to any one of the preceding embodiments, wherein the substrate comprises comprise a wood-based board, a particleboard, a thermoplastic board, a plywood, a lamella core, a veneer layer, a sheet, or a non-woven.

16. A veneered element, comprising
a substrate,
a first layer arranged on the substrate,
a second layer arranged on the first layer, and
a veneer layer arranged on the second layer, wherein the first layer is visible through a defect such as hole, cavity, crack and/or knot of the veneer layer, and wherein material originating from the second layer is present in the veneer layer.

17. A veneered element according to embodiment 16, wherein no material originating from the second layer is present in the defect such as a hole a cavity, crack or knot of the veneer layer.

18. A veneered element according to embodiment 16 or 17, wherein the defect such as cavity crack, hole and/or knot of the veneer layer is at least partially filled with material originating from at least the first layer.

19. A veneered element according to any one of embodiments 16-18, wherein the second layer is transparent or translucent.

20. A veneered element according to any one of embodiment 16-19, wherein the second layer is adapted to prevent material originating from the first layer from permeating into the veneer layer.

21. A veneered element according to any one of embodiment 16-20, wherein the first layer comprises pigments and/or dyes.

22. A veneered element according to any one of embodiments 16-21, wherein the first layer has a substantially uniform colour.

23. A veneered element according to any one of embodiment 16-22, wherein the second layer is free from pigments and dyes.

24. A veneered element according to any one of embodiments 16-22, wherein the second layer has a different colour than the first layer.

25. A veneered element according to any one of embodiments 16-24, wherein the substrate comprises a wood-based board, a particleboard, a thermoplastic board, a plywood, a lamella core, a veneer layer, a sheet, or a non-woven.

The invention claimed is:

1. A method to produce a veneered element, the method comprising
applying a first layer on a substrate,
applying a second layer on a veneer layer,
applying the veneer layer with the second layer applied thereto on the first layer such that the second layer is facing the first layer,
pressing the first layer, the second layer and the veneer layer together to form a veneered element, whereby material originating from the second layer permeates into the veneer layer, and
wherein, after pressing, the first layer is visible through at least one defect.

2. A method according to claim 1, wherein, during pressing, the at least one defect of the veneer layer is at least partially filled with material originating from the first layer.

3. A method according to claim 1, wherein applying the second layer on the veneer layer comprises applying a liquid on the veneer layer, and subsequently applying a dry powder on the veneer layer for forming the second layer.

4. A method according to claim 1, wherein the second layer is applied as a slurry.

5. A method according to claim 1, wherein no second layer is attached to one of the at least one defect of the veneer layer.

6. A method according to claim 1, wherein, during pressing, the second layer prevents material originating from the first layer from permeating into the veneer layer.

7. A method according to claim 1, wherein the first layer comprises pigments and/or dyes.

8. A method according to claim 1, wherein the first layer has a substantially uniform colour.

9. A method according to claim 1, wherein the second layer is free from pigments and dyes.

10. A method according to claim 1, wherein, after pressing, the second layer has a different colour than the first layer.

11. A method according to claim 1, wherein the second layer is transparent or translucent after pressing.

12. A method according to claim 1, wherein the first layer comprises a thermosetting binder.

13. A method according to claim 1, wherein the second layer comprises a thermosetting binder.

14. A method according to claim 1, wherein the first layer is applied as a dry powder.

15. A method according to claim 1, wherein the substrate comprises a wood-based board, a particleboard, a thermoplastic board, a plywood, a lamella core, a veneer layer, a sheet, or a non-woven.

\* \* \* \* \*